(12) United States Patent
Yoshida et al.

(10) Patent No.: US 6,549,377 B2
(45) Date of Patent: *Apr. 15, 2003

(54) MAGNETIC DISK DRIVE WITH A MOVABLE RAMP MECHANISM FOR RELIEVING IMPACT UPON LOADING AND UNLOADING

(75) Inventors: Takeshi Yoshida, Odawara (JP); Tetsuya Hamaguchi, Ibaraki-ken (JP); Tomokazu Ishii, Hiratsuka (JP); Shozo Saegusa, Ibaraki-ken (JP); Shinsuke Higuchi, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/066,675

(22) Filed: Feb. 6, 2002

(65) Prior Publication Data

US 2002/0071219 A1 Jun. 13, 2002

Related U.S. Application Data

(63) Continuation of application No. 09/391,405, filed on Sep. 8, 1999, now Pat. No. 6,369,988.

(30) Foreign Application Priority Data

Dec. 9, 1998 (JP) .......................... 10-349588

(51) Int. Cl.[7] .............................. G11B 5/54; G11B 21/22
(52) U.S. Cl. .................................................... 360/254.3
(58) Field of Search .......................... 360/254.3, 254.5, 360/255.2, 255.4

(56) References Cited

U.S. PATENT DOCUMENTS

| 4,644,429 A | 2/1987 | Babe |
|---|---|---|
| 4,661,873 A | 4/1987 | Schulze |
| 4,787,000 A | 11/1988 | Schulze |
| 4,956,733 A | 9/1990 | Dalziel |
| 4,965,685 A | 10/1990 | Thompson et al. |

(List continued on next page.)

FOREIGN PATENT DOCUMENTS

| JP | 5-28675 A | * | 2/1993 |
|---|---|---|---|
| JP | 6-96532 | | 9/1994 |
| JP | 8-129840 | | 5/1996 |
| JP | 8-161842 | | 6/1996 |
| JP | 10-64211 | | 3/1998 |

OTHER PUBLICATIONS

"Pivoting Dual Surface Load/Unload Ramp to Maximize Disk Allication", Apr. 1, 1995, IBM TDB, vol. 38, Issue No. 4, pp. 411–412.*

"Pivotable Ramp Head Load Mechanism for Direct Access Storage Devices", Jun. 1, 1995, IBM TDB, vol. 38, Issue No. 6, pp. 239–240.*

*Primary Examiner*—William Klimowicz
(74) *Attorney, Agent, or Firm*—Antonelli, Terry, Stout, Kraus, LLP (57) ABSTRACT

A magnetic disk drive having a disk for storing information, a spindle motor for rotating the disk, a head for recording information into the disk and reproducing information from said disk, a suspension supporting a slider provided with the head, a carriage supporting the suspension, a voice coil motor for exerting a rotational torque to the carriage so as to locate the head on the disk, a base and a cover, and a ramp serving as a guide for unloading the head from the disk. A part of the suspension slides over the ramp so as to effect the unloading operation and the position or the posture of the ramp is changed by sliding movement of the part of the suspension over and with respect to the ramp during the unloading operation.

7 Claims, 7 Drawing Sheets

U.S. PATENT DOCUMENTS

| | | |
|---|---|---|
| 5,148,339 A | 9/1992 | Yoshida |
| 5,237,472 A | 8/1993 | Morehouse et al. |
| 5,274,519 A | 12/1993 | Saito et al. |
| 5,283,705 A | 2/1994 | Iwabuchi |
| 5,285,338 A | 2/1994 | Sugahara et al. |
| 5,347,414 A | 9/1994 | Kano |
| 5,550,695 A | 8/1996 | Matsumoto |
| 5,574,604 A | 11/1996 | Berg et al. |
| 5,764,437 A | 6/1998 | Meyer et al. |
| 5,831,795 A | 11/1998 | Ma et al. |
| 5,870,255 A | 2/1999 | Hornung et al. |
| 6,028,745 A | 2/2000 | Nguyen et al. |
| 6,151,190 A | 11/2000 | Yamamoto et al. |
| 6,155,214 A * | 12/2000 | Manthey ................ 123/43 AA |
| 6,344,950 B1 * | 2/2002 | Watson et al. ........... 360/254.3 |
| 6,369,988 B1 * | 4/2002 | Yoshida et al. .......... 360/254.3 |

* cited by examiner

MAGNETIC DISK DRIVE WITH A MOVABLE RAMP MECHANISM FOR RELIEVING IMPACT UPON LOADING AND UNLOADING

CROSS REFERENCE TO RELATED APPLICATION

This is a continuation of U.S. application Ser. No. 09/391,405, filed Sep. 8, 1999, now U.S. Pat. No. 6,369,988 B1, the subject matter of which is incorporated by reference herein.

BACKGROUND OF THE INVENTION

1. Field of the Invention

The present invention relates to a magnetic disk drive provided with a load-unload mechanism, in which the reliability of the drive is ensured when part of a suspension impinges on a ramp during an unloading operation. The present invention is suitably applied to a small-size magnetic disk apparatus employing magnetic disks of a small size such as 3.5 inch, 3 inch, 2.5 inch, 1.8 inch, 1.3 inch, 1 inch and 0.7 inch.

2. Related Art

A conventional small-size magnetic disk apparatus will be described with taking a small size magnetic disk apparatus disclosed in JP-A-6-96532 as an example. Information-recording magnetic disks, arranged in a stacked manner, are rotated at a constant speed by a spindle motor fixedly mounted on a base. A head, mounted on a slider, is supported on a carriage through a suspension, and flies with a minute distance above the disk so as to record and reproduce information. The high-speed, high-precision positioning of the head is effected by rotating (pivotally moving) the carriage by a voice coil motor. A pivot assembly, comprising a sleeve in which a pivot shaft and two ball bearings are received, is mounted on the carriage, and the pivot assembly is fixed on the base, so that the carriage can be rotated about the pivot shaft. The voice coil motor for driving the carriage comprises a driving coil, permanent magnets and a yoke. The driving coil is mounted on the carriage whereas the remaining elements, that is, the permanent magnets and the yoke (which will be hereinafter referred as "magnet-yoke assembly"), are fixedly secured on the base. The driving coil, interposed between magnetic circuits, is subjected to the magnetic field action, and therefore by energizing the driving coil, the carriage can be driven, so that the head can be located at a desired position of the disk.

In a small-size disk apparatus, to enhance the recording density and an impact resistance is most important. To achieve this, there has been proposed a device equipped with a load-unload mechanism. The mainstream of such mechanism system is called "ramp load", and is disclosed, for example, in U.S. Pat. Nos. 5,237,472 and 5,574,604. A lift-tab, projected from a distal end of a suspension, is driven while guided by a curved cam surface (which is called a ramp), thereby loading the head onto the disk. When the read/write operation is finished, the head is unloaded from the disk, and is evacuated to the ramp. In this system, the head is evacuated from the disk, and therefore there is no fear of head-stiction. Therefore, there is no need to apply a conventional head-stiction prevention processing, such as texturing, to the disk, and a smooth disk can be used. Therefore, the flying height of the head can be reduced, and the recording density can be enhanced. And besides, since the head is evacuated from the disk, the impact resistance in an inoperative condition can be markedly enhanced.

Prior art techniques, which are liable to be confused with the present invention, are disclosed in JP-A-08-129840 and JP-A-08-161842. More specifically, these publications disclose a disk apparatus in which in order to increase a recording range of a magnetic disk, the position of a ramp in a disk rotation stand-by condition (during the loading operation or during the unloading operation) is different from the position of the ramp during the rotation of the disk (during the recording or during the reproducing). However, in these publications, there is no mention of the type of disk apparatus in which the ramp is so supported that the position of the ramp can be displaced during the loading and unloading operations.

In the ramp load system, disclosed in any of the above patents, the lift-tab, projected from the distal end of the suspension, is fixedly secured to the suspension, and the ramp is fixedly mounted on the base by screws or the like. Therefore, an impact force, produced by impingement occurring when the lift-tab slides onto the ramp during the unloading operation, is excessive, and can damage the head. And besides, as a result of this impingement, the lift-tab and the head are worn, and wear debris, resulting from these worn parts, deposits on the disk, the slider, the head and so on, and in some cases, this causes an operation failure or malfunction. Therefore, the number of loading and unloading operations has been limited.

SUMMARY OF THE INVENTION

It is an object of the present invention to provide a magnetic disk apparatus provided with a load-unload mechanism of high reliability, in which even if loading and unloading operations are frequently repeated, damage to a head due to impingement of a lift-tab during the unloading operation is eliminated, and the lift-tab and a ramp are less liable to wear, and an operation failure or malfunction due to wear debris is eliminated.

According to the present invention, there is provided a magnetic disk apparatus comprising a ramp serving as a guide for loading a head onto a disk and for unloading the head from the disk, wherein part of a suspension slides over the ramp so as to effect the loading operation and the unloading operation, and the ramp is so supported that during each of the loading and unloading operations, the position of the ramp can be displaced. In other words, during the loading operation, the position or the posture of the ramp is changed when the lift-tab begins to slide over the ramp. During the unloading operation, the position or the posture of the ramp is changed immediately after the lift-tab impinges on the ramp.

Further, in the present invention, the position or the posture of the ramp may be changed during the unloading operation.

In the present invention, one or two restraining members for restraining the position or the posture of the ramp are mounted on a base or a cover. When part of the suspension slides over the ramp during the loading operation or during the unloading operation, a friction force acts on the ramp, and the ramp is displaced until the ramp strikes against the restraining member, so that the position or posture of the ramp during the loading operation is different from the position or the posture of the ramp during the unloading operation.

In the present invention, a cushioning member, made of an elastic material or a viscous-elastic material, is provided on one of those portions of the ramp and the restraining member for contact with each other.

In the present invention, the ramp is supported for rotational displacement.

DESCRIPTION OF THE PREFERRED EMBODIMENTS

A preferred embodiment of the present invention will now be described with reference to the drawings.

Figure 1:
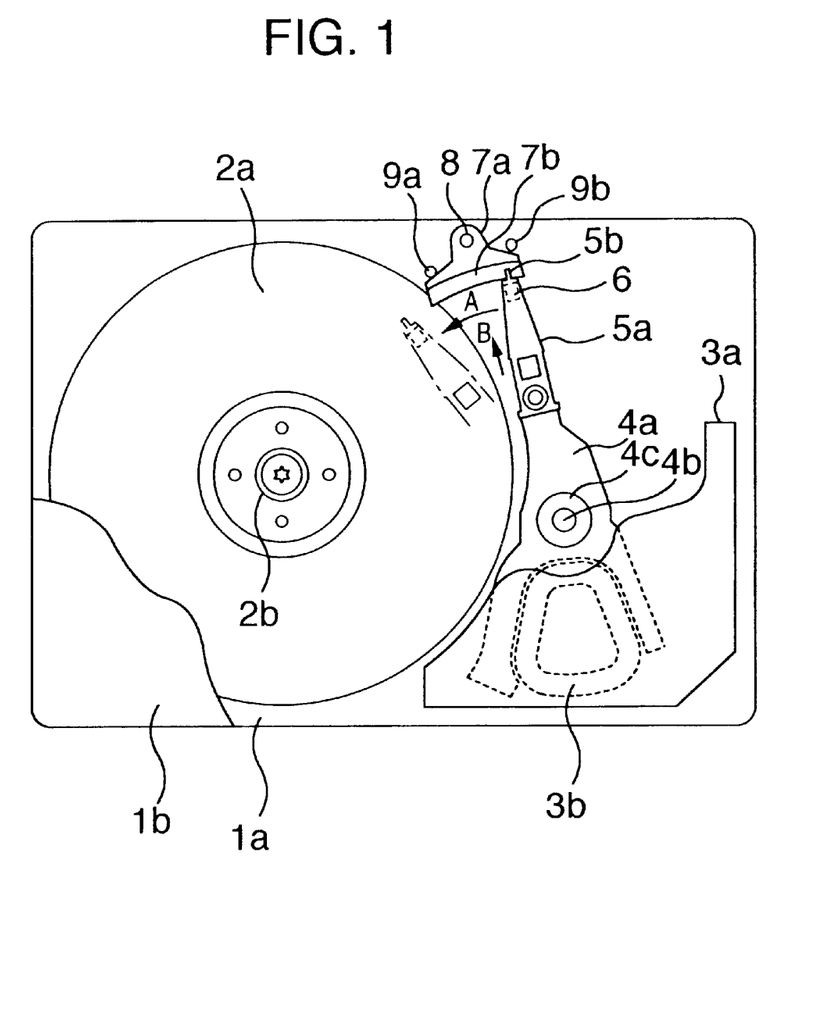
FIG. 1 is a view showing the overall construction of one preferred embodiment of a magnetic disk apparatus of the present invention including a ramp minute-rotational displacement mechanism and shock-absorbing portions.

FIG. 1 shows an overall construction of one preferred embodiment of a magnetic disk apparatus of the invention provided with a load-unload mechanism. In FIG. 1, a device cover 1b is shown as partly broken. A disk 2a is driven or rotated by a spindle motor 2b fixedly mounted on a base 1a. A head (not shown) is mounted on a slider 6, and flies with a minute distance above the disk 2a so as to record and reproduce information. The slider 6 is supported by a suspension 5a, and the suspension 5a is supported by a carriage 4a. A pivot assembly 4c, having two ball bearings (not shown) received between a pivot shaft 4b and a sleeve (not shown), is held by the carriage 4a, and the pivot shaft 4b is fixedly mounted on the base 1a, and with this construction the carriage 4a is supported for rotation (pivotal movement) about the pivot shaft 4b. A voice coil motor is constituted by a magnet-yoke assembly 3a, comprising a yoke and permanent magnets, and a driving coil 3b mounted on the carriage 4a. The carriage 4a is driven or rotated by this voice coil motor so as to position or locate the head on a desired track on the disk 2a, thereby effecting the recording and reproducing of information.

The device of the present invention is provided with the load-unload mechanism, and when the information is to be reproduced, the head, mounted on the slider 6, is loaded onto the disk 2a in a direction of arrow A. When the device is to be brought into a sleep condition, or is to be stopped, the head is unloaded from the disk in a direction opposite to the direction of arrow A, and slides onto a ramp 7a, and is held in an evacuated position. FIG. 1 shows an evacuated condition of theehead (that is, an unload-completed condition). The ramp 7a is mounted on the base 1a. The ramp 7a is rotatably (pivotally) supported by a ramp rotation shaft 8, and the rotational displacement of the ramp is limited by ramp-posture-restraining members 9 (9a and 9b). In this embodiment, although the ramp rotation shaft 8 and the ramp-posture-restraining members 9 are mounted on a horizontal surface of the base 1a, the manner of mounting these members is not limited to it, and the cover 1b and other member may be utilized. A rotation mechanism, utilizing the ramp rotation shaft, comprises ball bearings or slide bearings. The ramp-posture-restraining members 9 are made of a material with a high loss-factor, such as a viscous-elastic material. A lift-tab 5b, provided-at a distal end of the suspension 5a, slidingly moves over a sliding surface 7b (serving as a guide for this lift-tab 5b) formed on the ramp 7a, so that the head loading and unloading operations can be effected. The sliding surface 7b forms a cam surface, and enables the smooth sliding movement of the lift-tab 5b.

A feature of the present invention resides in the structure to reduce an impact force, produced when the lift-tab 5b first impinges on the ramp 7a, and then slides onto the ramp 7a during the unloading operation. More specifically, when the lift-tab 5b impinges on the ramp 7a, the ramp 7a is minutely rotated. When the ramp 7a is moved, the ramp strikes against the ramp-posture-restraining member 9 (9a, 9b), so that its rotational displacement is limited. When the ramp 7a is pressed against the ramp-posture-restraining member 9, the ramp-posture-restraining member 9 is elastically deformed, and then is restored into its original shape upon extinction of the impact force. The above impact energy is consumed by the minute-rotational displacement (movement) of the ramp and the elastic deformation of the ramp-posture-restraining member. As a result, the impact force, exerted on the suspension, is alleviated, so that damage to the head can be prevented. And besides, since the impact force is reduced, the lift-tab and the ramp are less liable to be worn, and therefore there can be achieved an apparatus of high reliability in which an operation failure due to wear debris is eliminated.

Figure 2:
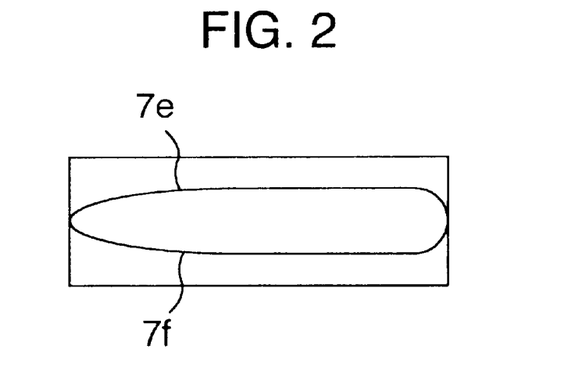
FIG. 2 is a front-elevational view of a ramp as seen in a direction of arrow B of FIG. 1.

The construction of the ramp, serving as a guide for the lift-tab, will be described with reference to FIG. 2. FIG. 2 is a front-elevational view of the ramp as seen in a direction of arrow B of FIG. 1. Reference numerals 7e and 7f denote lift-tab sliding surfaces, and the sliding surface 7e serves as a guide surface for loading and unloading the head relative to the upper surface of the disk whereas the sliding surface 7f serves as a guide surface for loading and unloading the head relative to the lower surface of the disk. Each of these guide surfaces is formed into a smoothly-curved surface including a flat surface. The illustrated embodiment is directed to an apparatus employing one disk, and in the case of an apparatus employing a plurality of disks, the number of lift-tab sliding surfaces is merely increased in accordance with the number of disks.

Figure 10:
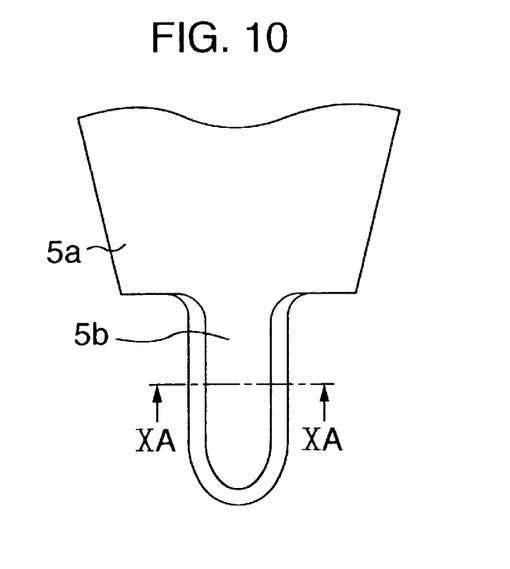
FIG. 10 is a plan view of the first example of a lift-tab.
Figure 10A:
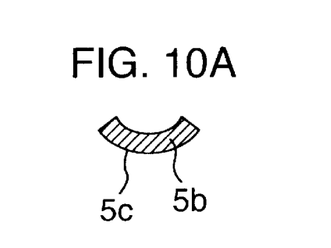
FIG. 10A is a cross-sectional view taken along the line XA—XA of FIG. 10.
Figure 11:
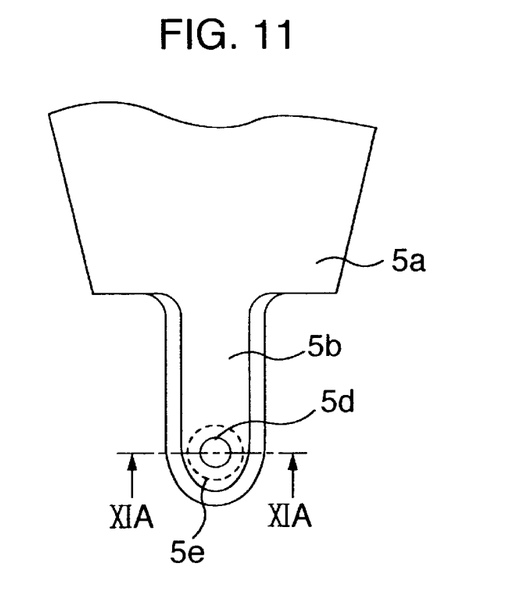
FIG. 11 is a plan view of the second example of a lift-tab.
Figure 11A:
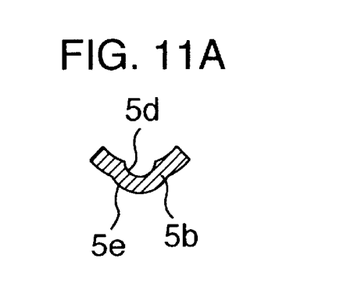
FIG. 11A is a cross-sectional view taken along the line XIA—XIA of FIG. 11.
Figure 12:
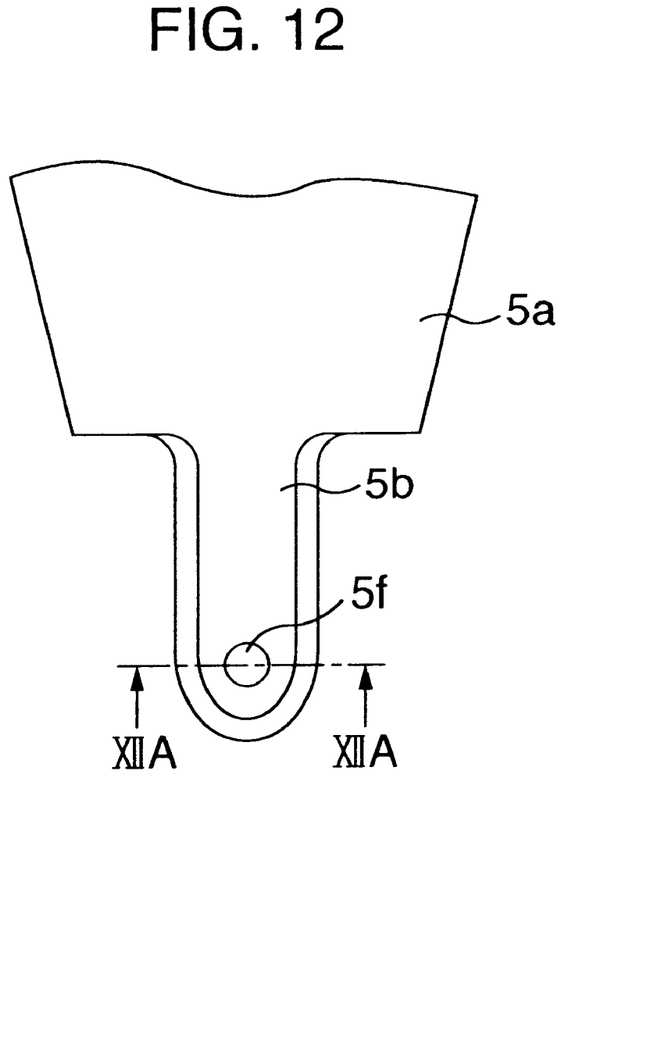
FIG. 12 is a plan view of the third example of a lift-tab.
Figure 12A:
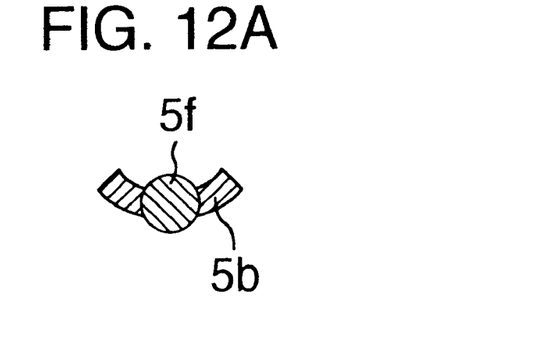
FIG. 12A is a plan view taken along the line XIIA—XIIA of FIG. 12.

The configuration of the lift-tab for sliding over the ramp will be described with reference to FIGS. 10, 11 and 12. FIG. 10 is a plan view showing the first example of a lift-tab projected from the suspension. As shown in FIG. 10A, a curved surface 5c for sliding contact with the ramp is formed on the lift-tab 5b, for example, by press working. FIG. 11 is a plan view showing the second example of a lift-tab. A hole 5d and a curved (semi-spherical) surface 5e for sliding contact with the ramp are formed in the lift-tab 5b, for example, by press working. In this example, the semi-spherical sliding surface 5e is formed on the lift-tab 5b, and therefore the lift-tab 5b can be disposed in point-contact with the ramp. FIG. 12 is a plan view showing the third example of a lift-tab. A hole is beforehand formed through the lift-tab 5b, and for example, a hard ball 5f is press-fitted into this hole. In this example, also, a semi-spherical sliding surface is formed on the lift-tab 5b, and therefore the lift-tab 5b can be disposed in point-contact with the ramp.

Figure 3:
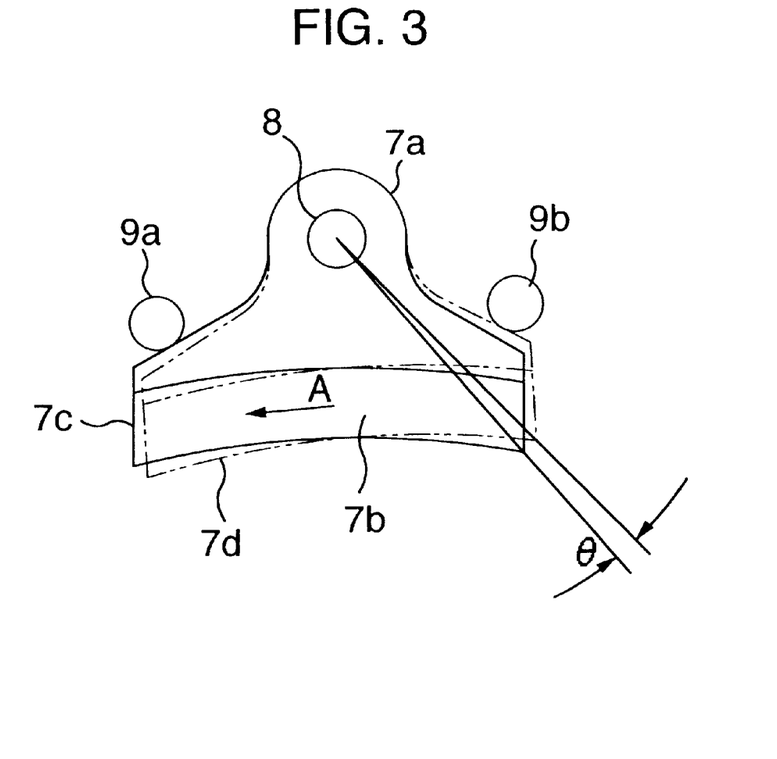
FIG. 3 is a plan view showing the first example of a ramp minute-rotational displacement mechanism and shock-absorbing portions.

Next, the minute-rotational displacement of the ramp and the shock absorption will be described with reference to FIG. 3. FIG. 3 is a plan view showing the first example of a ramp minute-rotational displacement mechanism and shock-absorbing portions. During the loading operation, the lift-tab (not shown) slides over the lift-tab sliding surface 7b, formed on the ramp 7a, in a direction of arrow A, and the ramp 7a is pressed against the ramp-posture-restraining member 9a, and in this condition (that is, in the posture of the ramp during the loading operation as indicated in a solid line 7c), the lift-tab moves apart from the ramp 7a, and is loaded onto the disk (not shown). During the unloading operation, the lift-tab moves in a direction opposite to the direction of arrow A, and impinges on the lift-tab sliding surface 7b, formed on the ramp 7a, to rotate the ramp 7a in a minute amount, and the ramp 7a is pressed against the ramp-posture-restraining member 9b, and in this condition (that is, in the posture of the ramp during the unloading operation as indicated in a dots-and-dash line 7d), the lift-tab slides over the lift-tab sliding surface 7b, and moves until the carriage (not shown) strikes against a stopper (not shown). As described above, because of the provision of the ramp-posture-restraining members 9a and 9b, the ramp 7a is supported for angular displacement through an angle θ, and during the loading operation and during the unloading operation, the posture of the ramp is changed, that is to say, the posture of the ramp during the loading operation is different from the posture of the ramp during the unloading operation. The ramp-posture-restraining members are made, for example, of a viscous-elastic material with a high loss-factor, such as rubber and a resin material. During the unloading operation, when the ramp 7a is rotationally displaced in a minute amount to strike against the ramp-posture-restraining member 9b, the ramp-posture-restraining member 9b is elastically deformed to absorb the impact energy.

Figure 4:
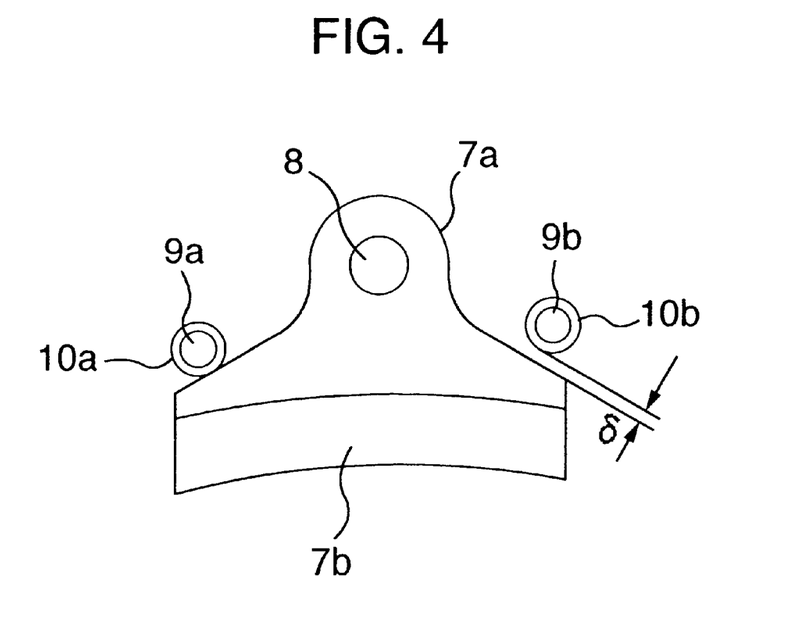
FIG. 4 is a plan view showing the second example of a ramp minute-rotational displacement mechanism and shock-absorbing portions.

Modified ramp-posture-restraining members will be described with reference to FIG. 4. FIG. 4 is a plan view showing the second example of a ramp minute-rotational displacement mechanism and shock-absorbing portions. The ramp-posture-restraining members 9a and 9b are made, for example, of stainless steel, aluminum or a plastics material. Cushioning members 10a and 10b, made of a viscous-elastic material such as rubber-and a resin material, are wound on the ramp-posture-restraining members 9a and 9b, respectively. During the unloading operation, the lift-tab (not shown) impinges on the lift-tab sliding surface 7b, formed on the ramp 7a, to rotationally displace the ramp 7a in a minute amount, and as a result the ramp 7a strikes against the ramp-posture-restraining member 9b, and the ramp-posture-restraining member 9b is elastically deformed to absorb the impact energy. Here, a gap between the ramp-posture-restraining member 9b and the ramp 7a during the loading operation is set at δ. However, during the unloading operation, the cushioning member 10b is elastically deformed by being pressed by the ramp 7a, and therefore the gap δ may be substantially zero.

Figure 5:
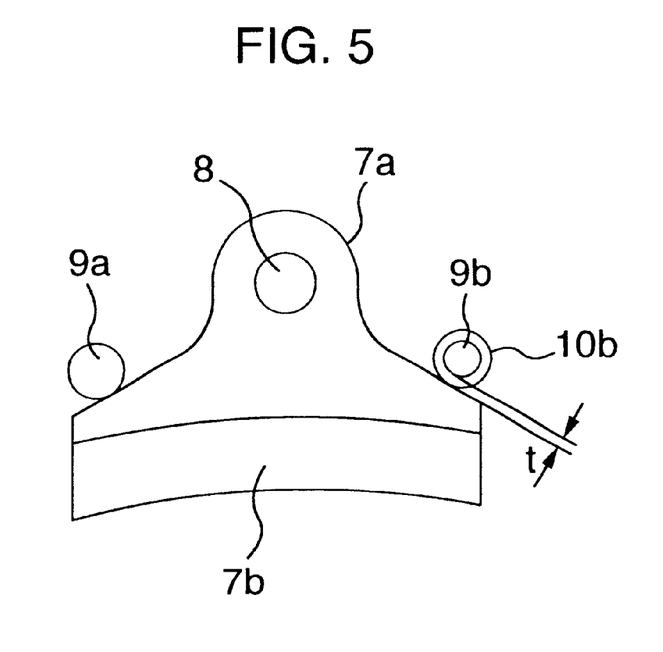
FIG. 5 is a plan view showing a third example of a ramp minute-rotational displacement mechanism and shock-absorbing portions.

FIG. 5 is a plan view showing the third example of a ramp minute-rotational displacement mechanism and a shock-absorbing portion. Ramp-posture-restraining members 9a and 9b are made of, for example, stainless steel, aluminum or a plastics material. A cushioning member 10b (having a thickness t), made of, for example, a viscous-elastic material such as rubber and a resin material, is wound on the ramp-posture-restraining member 9b. Here, a gap between the ramp-posture-restraining member 9b and the ramp 7a during the loading operation is set at zero. During the unloading operation, the lift-tab (not shown) impinges on the ramp 7a to rotationally displace the ramp 7a in a minute amount, and then the ramp 7a strikes against the ramp-posture-restraining member 9b, and thus the ramp-posture-restraining member 9b is elastically deformed, so that the impact energy is absorbed.

Figure 6:
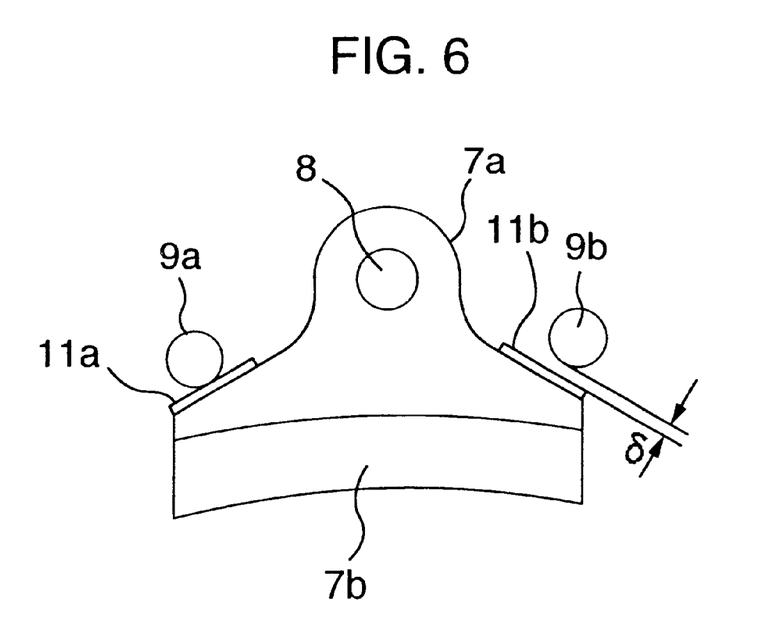
FIG. 6 is a plan view showing the fourth example of a ramp minute-rotational displacement mechanism and shock-absorbing portions

FIG. 6 is a plan view, showing the fourth example of a ramp minute-rotational displacement mechanism and shock-absorbing portions, and shows the posture of the ramp during the loading operation. Ramp-posture-restraining members 9a and 9b are made of, for example, stainless steel, aluminum or a plastics material. Cushioning members 11a and 11b, made of, for example, a viscous-elastic material such as rubber and a resin material, are secured to the ramp 7a by bonding or fitting into a groove formed on the ramp (not shown). During the unloading operation, the lift-tab (not shown) impinges on the ramp 7a to rotationally displace the ramp 7a in a minute amount, and then the ramp 7a strikes against the ramp-posture-restraining member 9b, so that the cushioning member 11b is elastically deformed to absorb the impact energy. Here, a gap between the cushioning member 11b and the ramp 7a during the loading operation is set at δ. However, during the unloading operation, the cushioning member 11b is elastically deformed by being pressed by the ramp 7a, and therefore the gap δ may be set at substantially zero.

With respect to the first example (FIGS. 1 and 3), the second example (FIG. 4), the third example (FIG. 5) and the fourth example (FIG. 6) of the ramp-posture-restraining members, although the ramp-posture-restraining members 9a and 9b, as well as the cushioning members 10a and 10b, have a circular cross-section, they are not limited to such a circular shape, but may have any other suitable shape such as an oval shape and a polygonal shape.

Figure 7:
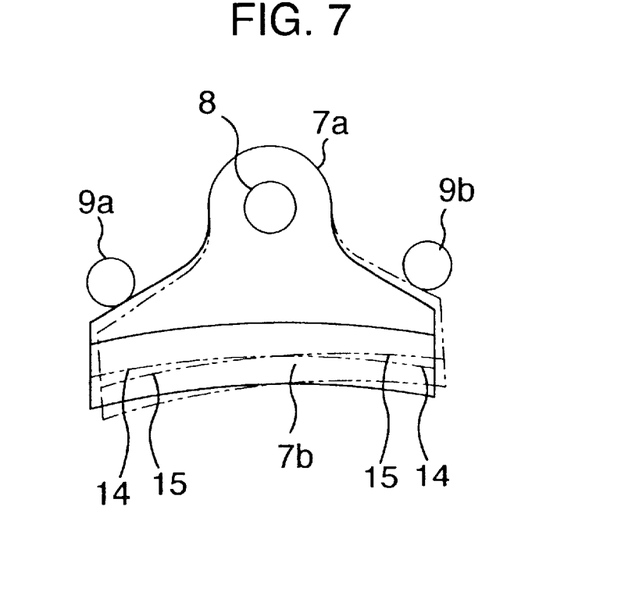
FIG. 7 is a view showing paths of sliding movement of a lift-tab in the ramp minute-rotational displacement mechanism during loading and unloading operations.

As described above, in the present invention, the impact force, applied to the suspension, is reduced, so that damage to the head can be prevented. And besides, since the impact force is reduced, the lift-tab and the ramp are less liable to wear. Furthermore, a path of sliding movement on the ramp during the loading operation is different from a path of sliding movement on the ramp during the unloading operation, and therefore an amount of wear of the ramp and lift-tab, caused by the sliding contact therebetween, is reduced to about a half, and there can be achieved an apparatus of high reliability in which an operation failure due to wear debris is eliminated. FIG. 7 shows the paths of sliding movement of the lift-tab on the ramp. During the loading operation, the sliding-contact point of the lift-tab moves along the sliding movement path indicated in a dot-and-dash line 14, and the head is loaded onto the disk. During the unloading operation, the sliding-contact point of the lift-tab moves along the sliding movement path indicated in a dot-and-dash line 15, and the lift-tab is stopped in a predetermined position (unloading home position) on the lift-tab-sliding surface 7b. Therefore, the path of sliding movement on the ramp during the loading operation and the path of sliding movement on the ramp during the unloading operation do not coincide with each other although the two paths intersect each other in the vicinity of a central portion of the lift-tab sliding surface 7b. In the above-mentioned conventional devices, the lift-tab always slides twice over the same path for each load-unload cycle (forward and backward strokes of one reciprocal movement). On the other hand, in the present invention, the lift-tab always slides once over two different paths for each load-unload cycle. Therefore the number of sliding movement for each of the two different paths is about a half as compared with the conventional devices. The direction of a friction force during the loading operation is opposite to the direction of a friction force during the unloading operation. Therefore, in the conventional devices in which the lift-tab slides over the same path during the loading and unloading operations, the shearing stress acting on sliding contact portions of the lift-tab and the ramp, becomes positive and negative alternately. In the present invention, however, the lift-tab always slides over the corresponding path substantially in the same direction during the loading and unloading operations, and therefore the amplitude of the stress is about a half of that in the conventional devices. As a result, an amount of wear of the ramp and lift-tab is about a half of that in the conventional devices.

Figure 8:
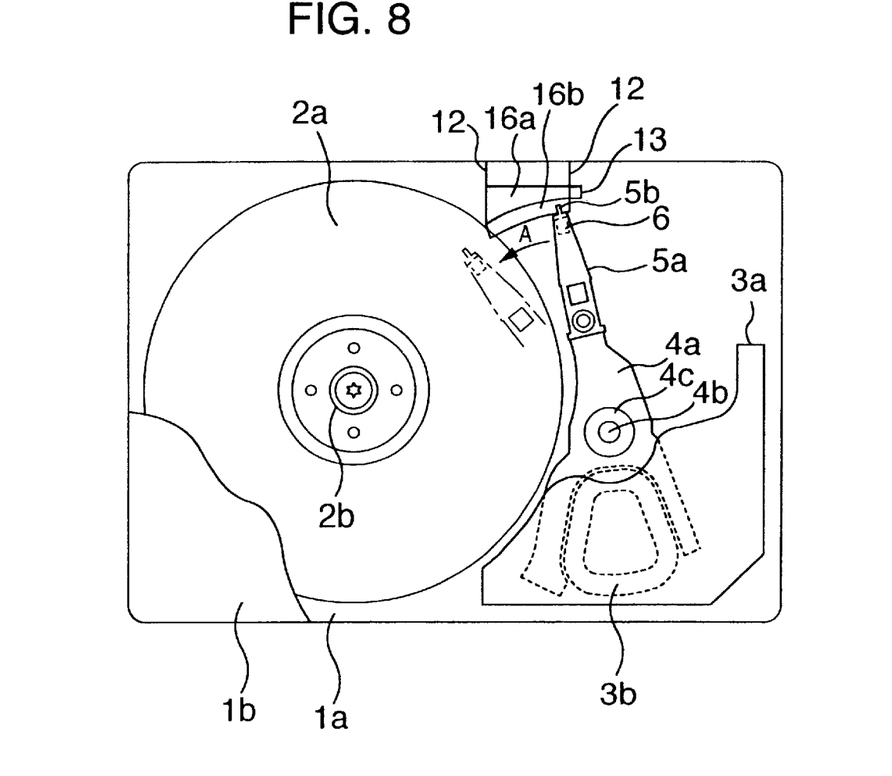
FIG. 8 is a view showing the overall construction of another embodiment of a magnetic disk apparatus including a ramp minute-translational displacement mechanism.
Figure 9:
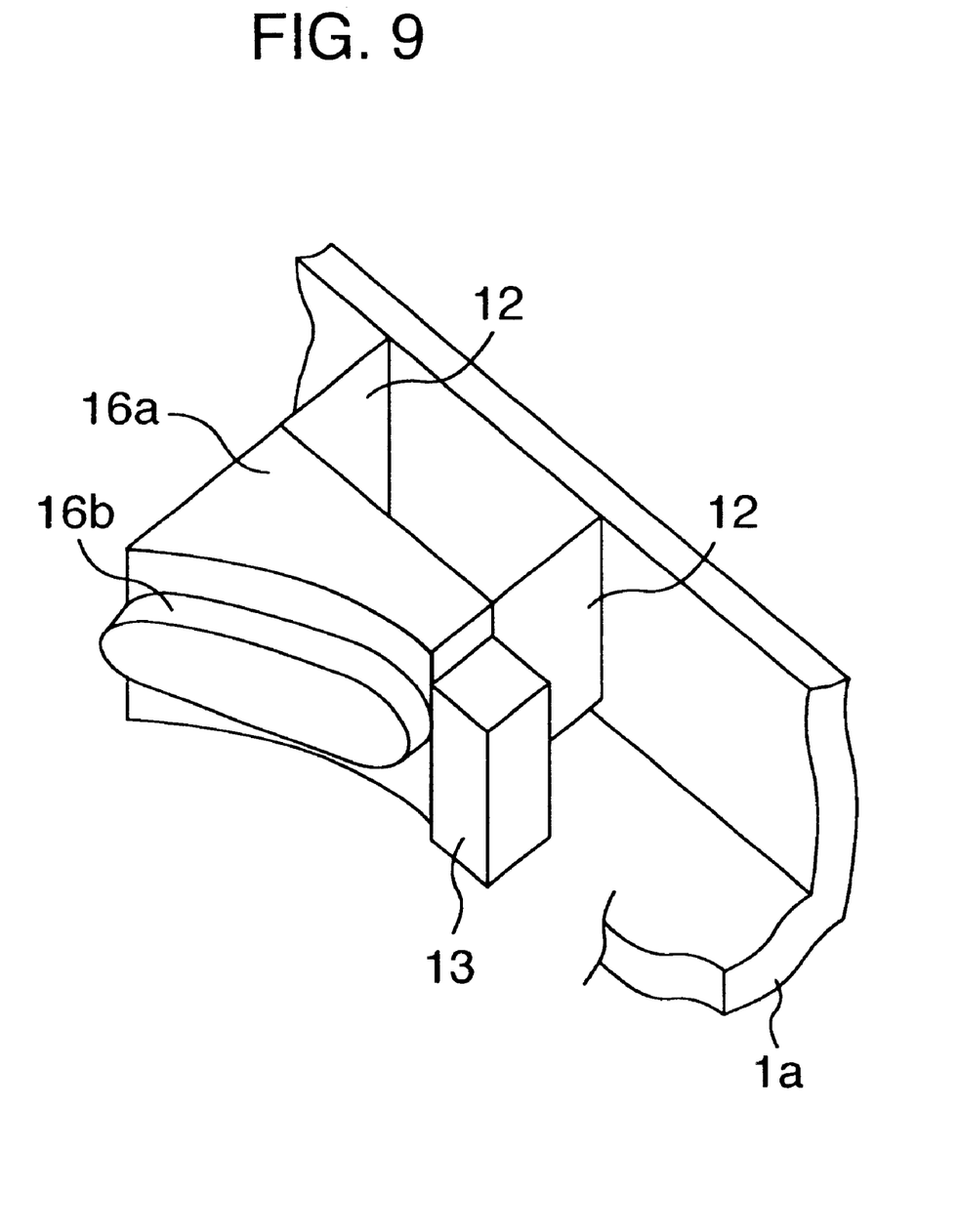
FIG. 9 is an enlarged view showing the ramp minute-translational displacement mechanism of FIG. 8.

The examples of mechanisms for effecting the minute-rotational displacement of the ramp have been described above, and next, an example of a mechanism for effecting a minute-translational displacement of a ramp will be described. FIG. 8 shows an overall construction of another embodiment of a magnetic disk apparatus of the invention incorporating a ramp minute-translational displacement mechanism. FIG. 9 is an enlarged view of the ramp minute-translational displacement mechanism. Those portions of this embodiment, identical to those of the magnetic disk apparatus of FIG. 1 (which includes the ramp minute-rotational displacement mechanism and the shock-absorbing portions), will be designated by identical reference numerals, respectively. FIG. 8 shows an evacuated condition of a head (unload-finished condition). A ramp 16a is mounted on a base 1a. Reference numeral 16b denotes a lift-tab sliding surface. The ramp 16a is supported by two sheet springs 12 for allowing translational movement only in one direction. Namely, with respect to the disk 2a, the ramp 16a can be moved in the in-plane direction of the disk 2a, and other degrees of freedom are restricted. In FIG. 8, the sheet springs 12 are arranged perpendicular to the direction of the lengthwise direction of the base 1a. However, the sheet springs 12 may be arranged so as to be parallel to a line connecting a lift-tab 5b in the evacuated condition of the head (the unload-finished condition) with a pivot shaft 4b. The ramp 16a is supported by the two sheet springs 12, and therefore is normally held in a neutral position. However, during the unloading operation, the lift-tab 5b impinges on the ramp 16a, so that the ramp 16a is displaced. Therefore, a cushioning member 13 is mounted on a horizontal surface of the base 1a and attached adjacent to a side surface of the ramp 16a. This cushioning member 13 limits the translational movement of the ramp 16a, and also absorbs the impact energy. In this embodiment, although the sheet springs 12 and the cushioning member 13 are mounted on the horizontal surface of the base 1a, the manner of mounting these members is not limited to it, and a cover 1b and other members can be utilized. The cushioning member 13 is made of a material with a high loss-factor, such as a viscous-elastic material.

In the present invention, the ramp is supported for minute displacement, and the posture of the ramp is changed during the unloading operation. The restraining members for restraining the posture of the ramp are provided, and the cushioning members are provided at portions that the ramp and the restraining members come into contact with each other. The impact energy, produced when the lift-tab slides onto the ramp during the unloading operation, is consumed by the minute displacement of the ramp and the deformation of the cushioning member.

As a result, the impact force, applied to the suspension, is reduced, and damage to the head is prevented. Since the impact force, produced during the unloading operation, is reduced, the lift-tab and the ramp are less liable to wear, and therefore there can be achieved an apparatus of high reliability in which an operation failure due to wear debris is eliminated. And besides, the sliding movement path on the ramp during the loading operation and the sliding movement path on the ramp during the unloading operation do not coincide with each other, and therefore the number of sliding movement, as well as the amplitude of the stress, is about a half of that in the conventional devices, and there can be achieved an apparatus of high reliability in which an operation failure due to wear debris is eliminated.

Having described the preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk drive comprising:
   a disk for storing information;
   a spindle motor for rotating the disk;
   a head for recording information into said disk and reproducing information from said disk;
   a suspension supporting a slider provided with said head;
   a carriage supporting said suspension;
   a voice coil motor for exerting a rotational torque to said carriage so as to locate said head on said disk;
   a base and a cover supporting and containing at least one of said spindle motor, said suspension, said carriage and said voice coil motor; and
   a ramp serving as a guide for unloading said head from said disk;
   wherein part of said suspension slides over said ramp so as to effect an unloading operation; and
   wherein the position or the posture of said ramp is changed by sliding movement of the part of said suspension over and with respect to said ramp during said unloading operation.

2. The magnetic disk drive according to claim 1, further comprising a restraining member for restraining the position or the posture of said ramp, said restraining member being provided on one of said base and said cover;
   wherein part of said suspension slides over said ramp during said unloading operation, and said ramp is displaced until said ramp strikes against said restraining member.

3. The magnetic disk drive according to claim 2, wherein said restraining member comprises a cushioning member provided at a portion of said restraining member to come into contact with said ramp.

4. The magnetic disk drive according to claim 3, wherein said cushioning member is made of an elastic material or a viscous-elastic material.

5. The magnetic disk drive according to claim 2, wherein said restraining member is made of an elastic material or a viscous-elastic material.

6. The magnetic disk drive according to claim 1, wherein said ramp is supported for rotation.

7. The magnetic disk drive according to claim 1, wherein said ramp is supported for translational movement.

* * * * *